March 5, 1957 W. R. ISOM 2,783,995
16MM SOUND PROJECTOR FILM PROPELLER APPARATUS
Filed Jan. 24, 1950

INVENTOR
Warren R. Isom
BY
Conder C. Henry
ATTORNEY

United States Patent Office 2,783,995
Patented Mar. 5, 1957

2,783,995

16 MM. SOUND PROJECTOR FILM PROPELLER APPARATUS

Warren R. Isom, West Collingswood, N. J., assignor to Radio Corporation of America, a corporation of Delaware Application January 24, 1950, Serial No. 140,177

5 Claims. (Cl. 271—2.3)

This invention relates to the driving of film and more particularly to an improvement in film propelling apparatus in which the film is engaged and driven at one edge.

In recording upon and reproducing from film it is highly desirable to maintain a constant tension and uniform speed at the place of recording or reproduction in order to maintain the status of the film at the place of translation in equilibrium and to prevent undesirable flexing of the film at this point. This is particularly true in loose loop sound filtering systems and especially where the film is engaged by propelling means at one edge only as is the case of certain types of 16 mm. sound reproduction systems. By engaging the film at one edge only, the propelling force has a tendency to deviate from the line of direction along which the film is guided and thereby upset equilibrium and result in unstable operation. In certain instances such instability may become extreme as in the case of certain types of sound film where one edge of the film is worked differently than the other in the manufacture, processing and use, and where very frequently the film is warped or crooked. Such unstable operation, whether straight or warped film is used, results in disturbances and fluttering in the sound reproduction or recording whose combined effects may be very undesirable.

It is therefore an object of this invention to provide a novel means of improved nature for guiding film which is engaged and driven at one edge so as to maintain the film in equilibrium and to prevent undesirable flexing.

It is a further object of this invention to provide a novel and simple means for advancing such film past a place of recording or reproduction so that the propelling force acting on the film is always in a direction parallel to that in which the film is guided.

Other and more detailed objects of this invention will appear as the following description proceeds.

Briefly, in accordance with this invention, the objectives are obtained by driving the film with the aid of a suitable driving mechanism which engages the film at one edge and guiding said film from the point of sound translation to the driving mechanism by means of a roller having a larger diameter at the end over which the edge of the film which is not engaged by the driving mechanism travels.

For a more complete understanding of the nature of the invention and the manner in which it may be carried into effect, reference should be made to the accompanying drawing forming a part of this specification which is illustrative of a preferred embodiment of the invention, and to the ensuing description thereof.

Figure 1:
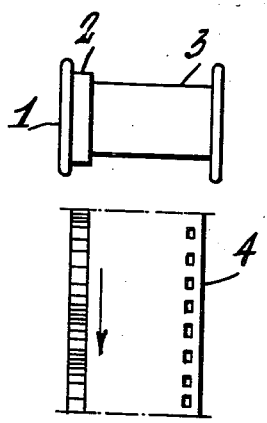
Fig. 1 shows the roller member which is the subject of this invention.

Referring now to Fig. 1, which shows a guide roller 1 designed in accordance with the invention having a small diameter at one end 3, and a larger diameter shown in the preferred form of a shoulder at the end 2, it will be seen that the smaller diameter is at the end of the guide roller over which the sprocket hole or driven edge of the film passes as shown by the relation of the piece of film indicated at 4 to the guide roller 1.

The opposite edge of the film carries the sound track or other registration which travels over the end of the guide roller having the increased diameter as shown at 1. In view of this relationship and to enable a clear understanding of the invention, the end of the guide roller having the smaller diameter will be hereinafter referred to as the sprocket hole end and the end having the larger diameter will be hereinafter referred to as the sound track end.

Figure 2:
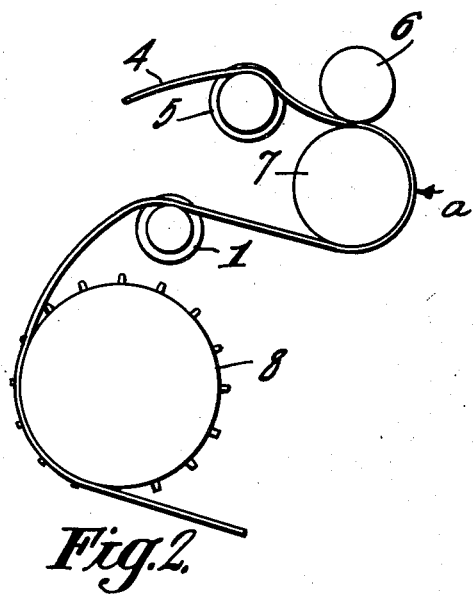
Fig. 2 shows the position of this roller member in the film path of an ordinary projector.

Referring now to Fig. 2, the position of the guide roller of Fig. 1 is shown in relation to other components of the film path in an ordinary projector. The film 4 is introduced to the sound translation point over a guide roller 5 around the sound drum 7 which has associated therewith a pressure roller 6 and then is guided by means of the guide roller to the propelling means shown in the form of a sprocket member at 8. At the sound take off point the film is loose and unsupported and therefore subject to a flexing action as the film is passed around the drum. This is especially characteristic of a loose-loop sound filtering system and is one of the difficulties which this invention is designed to overcome as will be hereinafter described.

Figure 3:
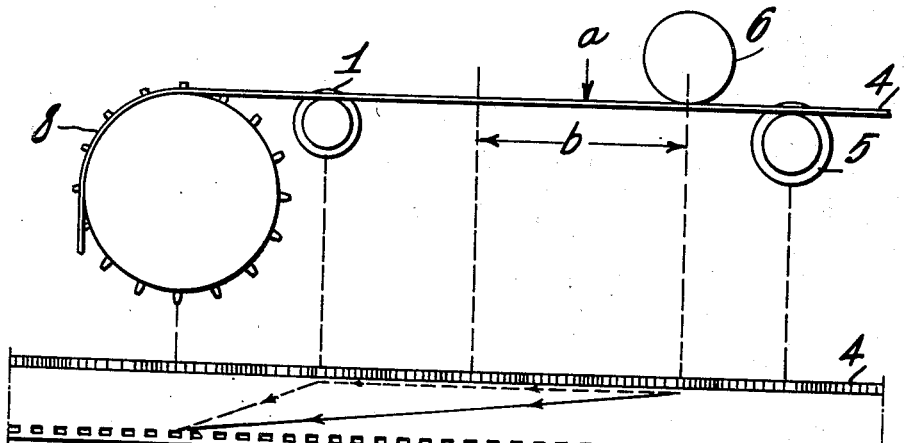
Fig. 3 is a diagrammatic view showing the film path of Fig. 2 resolved in a straight line so as to indicate the action of the film at various points in the system.

Referring now to Fig. 3 in which like numerals indicate like parts, the film path of Fig. 2 is shown resolved into a straight line so that the forces acting on the film in this area may be projected on to a representative film strip shown at 4 and therefore be more clearly understood. The distance indicated at 6 represents the section of film which passes around the sound drum, 7, with the sound take off point shown at a. The contact points of the film 4, with the guide roller 5, the pressure roller 6, the take off from the sound drum a, the guide roller 1, and the sprocket 8 are represented by the dotted lines which are projected onto the film strip 4. The solid line running from the sound track end of the film at the initial point of contact with the sound drum to the sprocket hole, which initially engages the sprocket 8 at the opposite edge of the film, represents the direction of the film propelling force when the guide roller 1 is of equal diameter throughout. Thus it may be seen that the film is pulled at the sound take off point in a direction different from that in which it is directed by the guide roller 1 by reason of a component of the propelling force being in a direction normal to the path of said film. The static friction between the film 4 and the drum 7 resists this tendency, but when the component of the film propelling force, which is normal to the direction of the film, becomes large enough to overpower this resistance, the film snaps over and overshoots the point of equilibrium due to the difference between the increased sliding friction over the static friction. Another factor which contributes to and aggravates this tendency is the flexing of the film. The flexing at the sound take off point results from the fact that the film is loose and unsupported at this point. The effect of these combined disturbances may be such that they are very noticeable in the audible range. However, if the diameter of the guide roller 1 is increased at the end opposite that over which the engaged edge of the film passes in accordance with this invention, these disturbances may be eliminated or greatly reduced.

The effect of this increased diameter at the sound track end of the guide roller is indicated by the dotted line on the film 4, which represents the direction of the propelling force between the sound drum and the guide roller 1. It will be seen that the troublesome component of this force, which previously existed normal to the direction of the film when a guide roller of uniform diameter throughout was used, is resolved in a direction which is parallel to the direction of the film by means of the guide roller 1 having the increased diameter at the sound track end. It is seen that the sound track edge of the film is now prevented from flexing unduly at the point of sound translation because the force, being transmitted along the film, holds this edge under equal tension with the other edge against the sound drum and the film is no longer free to flex. Likewise, the tendency of the sliding friction of the film to overcome the opposing static friction has been eliminated along with the component of the propelling force that was normal to the direction of the film.

Thus, by doing away with a uniform diameter throughout the guide roller, which is the subject of this invention, the undesirable effects which are attendant with propelling the film by engaging it at one edge only, whether the film be straight or warped in its manufacture, can be greatly reduced or eliminated so that stable and satisfactory operation will result. The diameter of the sound track end of the guide roller should, in its preferred form, be enough larger than the sprocket hole end so that stabilized operation is achieved even when the worst film in general use is encountered.

While I have shown and described what I consider to be the preferred embodiment of my invention, it will be obvious to those skilled in the art that changes and modifications, particularly with respect to the manner in which the difference in diameters is obtained, may be made without departing from the scope of my invention as defined by the appended claims.

I claim as my invention:

1. In a loose loop sound filtering system having a sound carrying film, the combination of sound translating means including a sound drum, a film propelling means to engage said film only at the edge farthest from the edge carrying the sound record, and a roller having an increased diameter portion at the end corresponding to the nondriven edge of said film said increased diameter portion being of a width narrow with respect to the width of said roller, said roller being spaced away from and axially parallel with said propelling means and said sound drum whereby said film may be held in tension at the edge corresponding to the nondriven edge and thereby be guided over said sound drum.

2. In a film recording or reproducing apparatus having a sound drum and propelling sprocket adapted to engage a sound carrying film only at the edge farthest from the edge carrying the sound record, a film guiding roller having an increased diameter portion at the end corresponding to the nondriven edge of said film said increased diameter portion being of a width narrow with respect to the width of said roller, said roller being spaced away from and axially parallel with said propelling sprocket and said sound drum whereby said film may be held in tension at the edge corresponding to the nondriven edge and thereby be guided over said sound drum.

3. In a film recording apparatus, friction means adapted to guide sound carrying film engaged by propelling means at one edge only past a point of sound translation comprising a roller having an increased diameter portion at the end corresponding to the nondriven edge of said film said increased diameter portion being of a width narrow with respect to the width of said roller, a sound drum at said point of sound translation spaced away from and axially parallel with said propelling means and said sound drum whereby said film may be held in tension at the edge corresponding to the nondriven edge and thereby be guided over said point of translation.

4. In a film recording or reproducing apparatus having a driven sound film which moves in a longitudinal direction, the combination of a sound translating means including a drum, a film propelling means adapted to engage said film at only one edge thereof, and a roller over which said film passes adapted to guide said film, said roller being spaced away from said drum and having a decreased diameter portion at the edge corresponding to the driven edge of said film and having a film contacting shoulder of a width less than one-half the width of said film whereby said film will be pulled in tension on the contacting shoulder causing a force translation parallel to the direction of film travel at the point of recording or reproducing.

5. In a film recording or reproducing apparatus having a driven sound film which moves in a longitudinal direction, the combination of a sound translating means including a drum, a film propelling means adapted to engage said film at only one edge thereof and a roller over which said film passes adapted to guide said film, said roller being spaced away from said drum and having an increased diameter portion at the farthest edge from the driven edge of said film, and adapted to hold said film in tension at one edge at the increased diameter portion, said increased diameter portion being of a width less than one-half the width of said film whereby a force translation caused by said film in tension at one edge will result in a force resolution parallel to the direction of film travel at the point of recording or reproducing.

References Cited in the file of this patent

UNITED STATES PATENTS

| | | |
|---|---|---|
| 1,920,789 | Heisler | Aug. 1, 1933 |
| 2,031,813 | Batsel et al. | Feb. 25, 1936 |
| 2,164,375 | Berndt | July 4, 1939 |
| 2,456,702 | Haringx | Dec. 21, 1948 |
| 2,475,743 | Haringx | July 12, 1949 |
| 2,499,947 | Collins | Mar. 7, 1950 |